Oct. 11, 1966    E. A. EISEL    3,277,922

FLOW CONTROL DEVICE

Filed May 19, 1964

INVENTOR.
ERNEST A. EISEL
BY

ATTORNEY

United States Patent Office 3,277,922
Patented Oct. 11, 1966

3,277,922
FLOW CONTROL DEVICE
Ernest A. Eisel, Canoga Park, Calif., assignor to
North American Aviation, Inc.
Filed May 19, 1964, Ser. No. 368,607
2 Claims. (Cl. 137—613)

The present invention relates to flow control devices for physical and chemical apparatus and more particularly to stopcocks and flow regulating devices.

The present invention is described as being particularly adaptable for use in connection with experimental chemical apparatus is which the flow of a gaseous medium is to be controlled or completely cut off, although a variety of other uses will be apparent.

In connection with experimental apparatus where it is desired to expose samples, in a vacuum or controlled atmosphere, to irradiation, e.g., gamma rays, the access to as well as the volume provided for sample placement is usually restricted. Therefore, the usual large stopcock and other flow controlling devices introduce space and access problems and may require modification of the irradiation chamber in order to accomplish the needed flow control.

It is the primary object of the present invention to provide a stopcock for chemical apparatus which takes up no more space than a standard taper joint and provides for increased strength and versatility of use.

Another object of the present invention is to provide a stopcock which can readily be fabricated from standard taper joint elements without increasing the sealing areas utilized.

A further object of the present invention is to provide an in-line stopcock for chemical apparatus which has a minimum of parts and which is easier and cheaper to fabricate than a standard chemical apparatus stopcock, and which does not require the grinding of re-entrant surfaces.

A still further object of the present invention is to provide an improved stopcock which can be fabricated from standard taper joint elements and which may be utilized to control, in a calibrated manner, precisely predetermined volumes of a fluid.

These and other objects of the present invention will be more apparent from the following detailed description of various embodiments of the present invention taken together with the drawings, hereby made a part thereof, in which.

Figure 1:
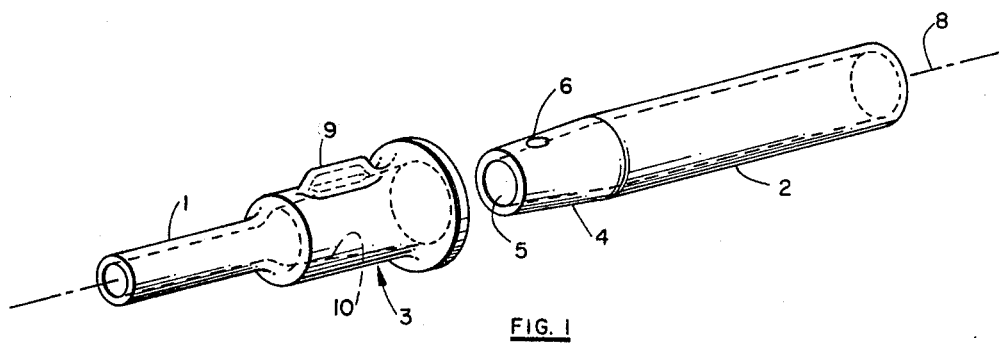
FIG. 1 is a perspective expanded view of the stopcock of the present invention.

Referring now to the drawings in detail, the stopcock of the present invention is shown in a disassembled condition in FIG. 1. The stopcock has a pair of tubular elements 1 and 2 comprised of glass, quartz or similar materials, with end sections 3 and 4, having complementary inner and outer tapered surfaces, respectively. These elements constitute the standard tapered joint referred to as a tubular male and female joint. The stopcock of the present invention utilizes this standard combination, with modifications, to provide a stopcock of the in-line type. The end of the tapered portion 4 is sealed closed by closure 5 and an aperture 6 is drilled or otherwise provided in the wall of the tapered portion 4. The tapered portion 3 of the female joint portion is provided with an elongated narrow protrusion defining a channel 7 and formed by displacing, in a direction normal ot the axis 8, a narrow longitudinally extending portion 9 of the wall of tapered end section 3. The displaced portion 9 forming the channel 7 approximately parallel to but displaced from the axis 8 is located along the internal tapered surface 10 of section 3 so that it extends from approximately the center of the tapered surface 10 to a point beyond the end 5 of the male portion when the two are in an assembled position (see FIG. 2).

The aperture 6 in tapered portion 4 is located near the end 5 of the portion 4 so that when assembled it will register with the channel 7 and provide a continuous passage between the interior volume 11 of element 1, through channel 7, aperture 6 and into interior volume 12 of element 2. In this manner the rotation of either element 1 or element 2 will bring one end of the channel 7 into alignment with aperture 6 and allow the free passage of a fluid between the two volumes 11 and 12. Conversely, the flow of fluid between these two volumes may be stopped by rotating either element 1 or 2 to move the channel 7 and aperture 6 out of alignment. In work involving calibrated volumes, the volume of the usual stopcock must be separately determined. However, in the arrangement of the present invention the volume defined by walls of aperture 6 always remains a part of the volume 12 of element 2 and the volume of the channel 7 always remains a part of the volume 11 of element 1.

Figure 2:
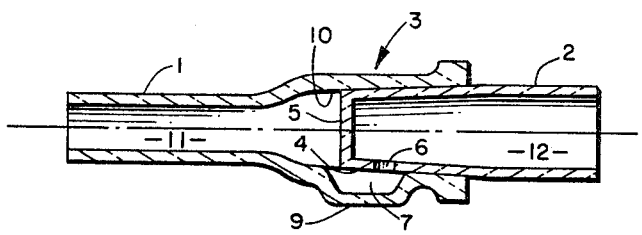
FIG. 2 is a sectional view of the stopcock of the present invention in operable relationship.
Figure 3:
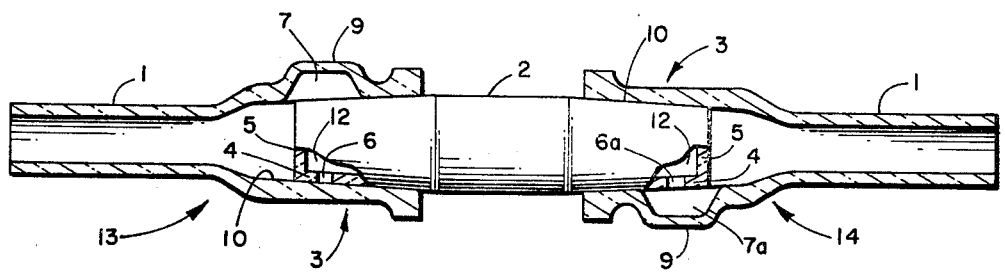
FIG. 3 shows a sectional view of an embodiment utilizing a pair of stopcocks of the present invention.

It is also apparent from FIGS. 1 and 2 that the arrangement of the present invention provides a convenient and simple way for introducing controlled or metered volumes of a fluid into a system. Such an arrangement is shown in FIG. 3. In this embodiment two in-line tapered joint stopcocks of the present invention are utilized and are designated as parts 13 and 14. Interconnecting the two is a single tubular element 2 common to both receiving elements 13 and 14. Thus, a fluid from a source (not shown) attached to tubular element 1 of part 13 would not pass into the internal volume 12 of element 2 since aperture 6 and channel 7 are not in alignment. However, by proper arrangement of channel 7 of part 14 so that channel 7a of part 14 could register with aperture 6a of element 2 the volume 12 could be evacuated. By rotating element 2 the aperture 6a is moved out of alignment with channel 7a and is sealed off from the volumes 11 of both parts 13 and 14. Further rotation would align aperture 6 with channel 7 of part 13 and allow the fluid from the source to fill the volume 12 within element 2. Further rotation would result in 6a and 7 being in registration and would allow the precisely measurable volume 12 of the fluid to enter a chemical system connected to tubular element 1 of part 14. In this manner precise control and metering of fluids into a system may be accomplished since the volume 12 will always include the volumes defined by the walls of apertures 6 and 6a.

It is also apparent from FIG. 3 that when channels 7 and 7a are axially aligned so that apertures 6 and 6a will simultaneously come into registration with the appropriate channel upon rotation of element 2 that by a single movement, i.e., a rotation of element 2, a double valve closure may be accomplished thereby decreasing the possibility of leaks between two systems attached to the respective ends of parts 13 and 14.

The present invention is not limited to the specific details of the particular embodiments described, since many modifications will be apparent to those skilled in the art, the scope of the present invention being limited only by the appended claims.

I claim:

1. A metering valve comprising in combination a first element having a longitudinally extending internal passage, the ends of said passage being closed, the outer surface of both ends having annular surfaces adapted to be rotatably seated within a complementary interior annular surface at one end of each of a pair of oppositely disposed second elements, each of said second elements having an interior volume therein extending into the volume defined by said interior annular surface and adapted to be closed by one end of said first element, a channel formed in a portion of the wall of each of said second elements, said channel connecting said interior volume of each of said second elements with said interior annular surfaces of said second elements, an aperture located in each of the annular surfaces of said first elements at a point spaced from said closed end and adapted to selectively connect the passage of said first element to said channels.

2. A metering valve comprising in combination a tubular element having an interior volume and annular surfaces at both ends, each of said ends being closed and each of said annular surfaces having an aperture therein communicating with the interior volume at a point spaced from said closed ends, a pair of tubular end sections having interior volumes and interior annular surfaces adapted to rotatably seat respective opposite annular surfaces of said tubular element, said tubular element being rotatably positioned in and sealing the ends of said end sections, each of said end sections having an elongated channel contiguous with the interior volume of said section, said aperture at one end of said element and one of said channels being adapted to form a continuous passage connecting the interior volume of one of said sections with said interior volume of said tubular element, said other aperture and said other channel forming a discontinuous passage when said first aperture is connected to said first passage so that by rotation of said tubular element a known volume could be selectively connected to the interior volume of said end sections.

References Cited by the Examiner

UNITED STATES PATENTS

| | | | |
|---|---|---|---|
| 184,573 | 11/1876 | Becker | 251—344 |
| 764,322 | 7/1904 | Wiegand | 251—344 |
| 925,587 | 6/1909 | Mitchell | 251—344 X |
| 2,509,671 | 5/1950 | Christensen | 251—344 |
| 2,803,854 | 8/1957 | Smous | 251—344 X |
| 3,150,686 | 9/1964 | Kachline | 137—608 |

FOREIGN PATENTS

| | | |
|---|---|---|
| 118,640 | 7/1944 | Australia. |
| 890,339 | 2/1962 | Great Britain. |

M. CARY NELSON, *Primary Examiner.*

S. SCOTT, *Examiner.*